A. BOURY.
REGULATING DEVICE.
APPLICATION FILED JULY 16, 1912.
1,133,000.
Patented Mar. 23, 1915.
2 SHEETS—SHEET 1.
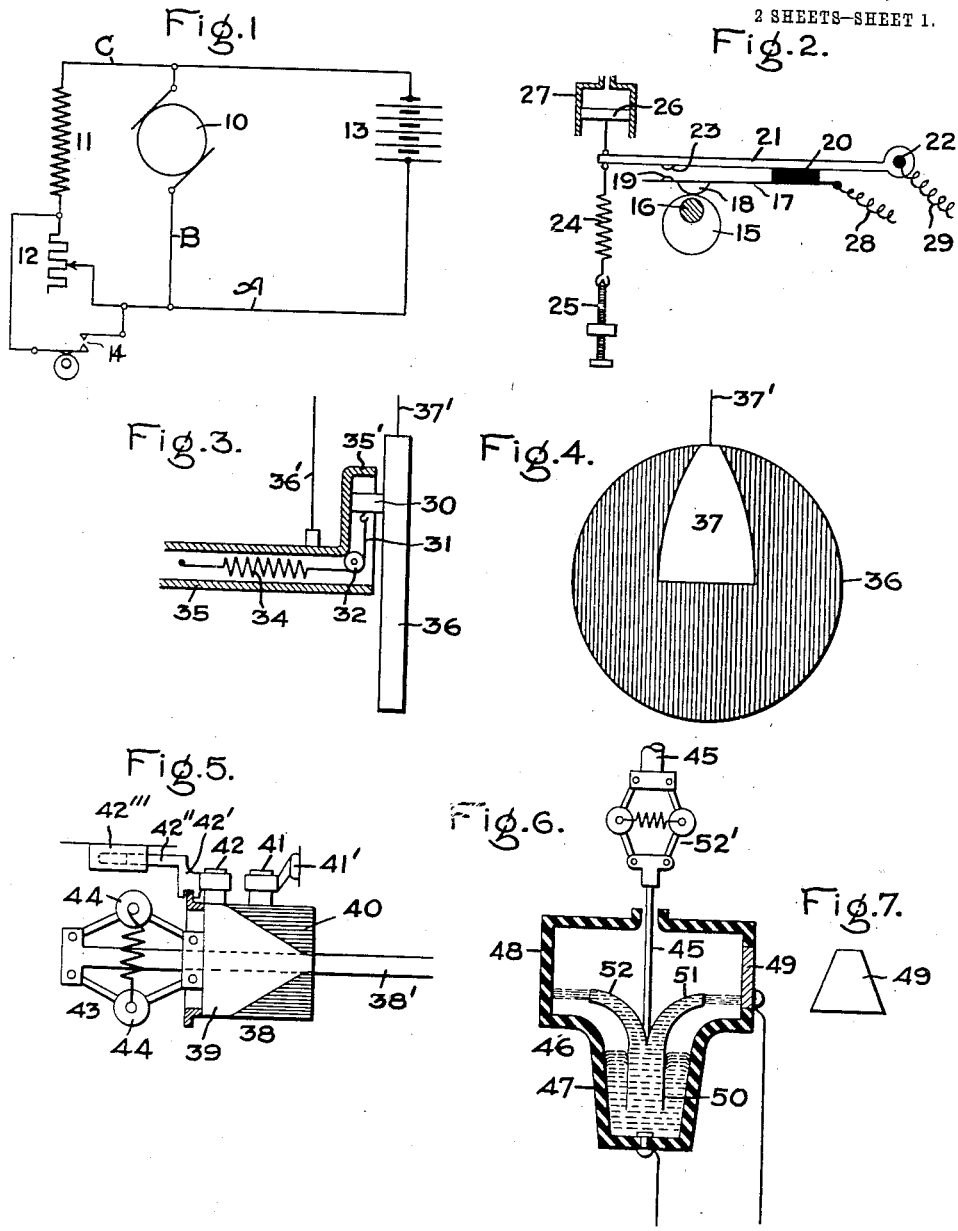
WITNESSES:
J. Earl Ryan
J. Ellis Glen
INVENTOR:
ANDRÉ BOURY,
BY Albert G. Davis
HIS ATTORNEY.

A. BOURY.
REGULATING DEVICE.
APPLICATION FILED JULY 16, 1912.
1,133,000.
Patented Mar. 23, 1915.
2 SHEETS—SHEET 2.
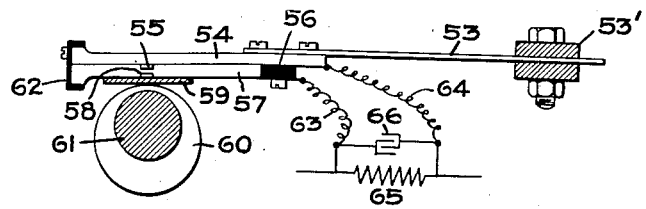
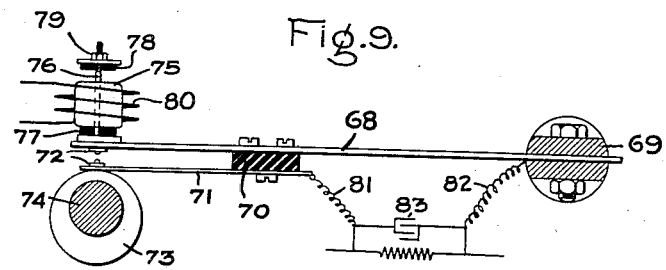
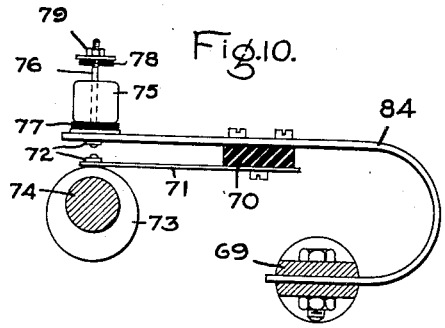
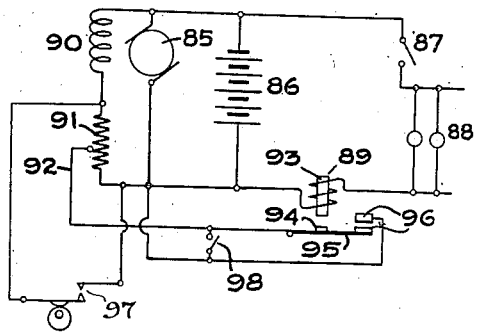
WITNESSES:
F. Earl Ryan.
J. Ellis Glenn
INVENTOR:
ANDRÉ BOURY,
BY Albert G. Davis
HIS ATTORNEY.

UNITED STATES PATENT OFFICE.

ANDRÉ BOURY, OF PARIS, FRANCE, ASSIGNOR TO GENERAL ELECTRIC COMPANY, A CORPORATION OF NEW YORK.

REGULATING DEVICE.

1,133,000.  Specification of Letters Patent.  Patented Mar. 23, 1915.

Application filed July 16, 1912. Serial No. 709,813.

*To all whom it may concern:*

Be it known that I, ANDRÉ BOURY, a citizen of France, residing at Paris, France, have invented certain new and useful Improvements in Regulating Devices, of which the following is a specification.

My invention relates to regulating devices for use in connection with electric generators, and more particularly to regulators for use in connection with variable speed generators. Generators of this kind are commonly used on self-propelled vehicles to furnish energy for the operation of lamps and other translating devices. Ordinarily storage batteries are used in connection with such generators so that when the speed of the generator is too low to produce a sufficiently large electromotive force for the satisfactory operation of the translating devices the storage battery will assume the load. When the speed of the generator is such that the voltage impressed on the system is in excess of the battery voltage, connections are so arranged that the storage battery is recharged. In order to avoid injury to the battery, its charging current should be substantially constant.

The object of my invention is to provide means for keeping one feature of the energy supplied by a variable speed generator to an external circuit substantially constant within certain speed limits. I attain this object by means of an intermittent cut-out or interrupter which is mechanically operated and which is so connected to the generator armature or other device whose speed corresponds to that of the armature that the ratio of its time of closure to that of its time of opening will decrease as the speed of the said armature increases.

My interrupter or cut-out may be arranged to alternately open and close a short circuit about an appreciable resistance in the field circuit of the generator, the period when the resistance is in the circuit increasing in length as the speed of the armature increases. Arranged in this way the operation is somewhat similar to that of the well known Tirrill regulator in which considerable resistance is intermittently cut in and out of the field circuit by electromagnetic means controlled by variations in the line voltage. In this application of my invention the regulation of the field is dependent directly upon the speed of the armature and the generator voltage is kept substantially constant. A modification of this arrangement is to locate the interrupter in the field circuit of the generator so as to intermittently make and break the same, the period of break increasing as the speed of the armature increases.

Instead of utilizing my mechanical interrupter or cut-out in either of the above described ways I may utilize the same to periodically interrupt the charging circuit of the storage battery. According to this arrangement the ratio of the total time when the circuit is complete to that of when it is open decreases as the speed of the armature and therefore the energy furnished by the generator increases. This results in an intermittent charging current but at the same time the amount of energy supplied to the battery will be substantially constant. Still another arrangement is to utilize the cut-out for interrupting both the energy supply to the field of the generator and also that supplied to the storage battery. This will tend to keep the energy supply to the battery substantially constant.

I prefer to utilize my interrupter in the first described manner, *i. e.*, to interrupt the short circuit of the field resistance, on account of the fact that in this arrangement the current interrupted is comparatively small and the sparking at the contacts is least.

My invention will be more clearly understood by reference to the accompanying drawings which show the same embodied in several specific forms:

Figure 1 is a diagrammatic view of a system showing the manner in which my invention may be utilized; Fig. 2 shows a regulator embodying my invention; Fig. 3 is a vertical section of a modification; Fig. 4 is an elevation of the disk forming part of the same; Fig. 5 is an elevation of still another modification; Fig. 6 is a vertical section of another modification; Fig. 7 is a detail view of the conducting plate forming part of the same; Figs. 8, 9 and 10 are vertical sections of further modifications of my invention; Fig. 11 is a diagrammatic view showing a lighting system which includes a storage battery, and in which my invention is utilized.

In Fig. 1, 10 is the armature of a shunt wound direct current generator, 11 the field of the same, 12 the field regulating resistance and 13 is a secondary battery adapted to be charged by the generator. The regulator forming the subject matter of this application is preferably located at 14 so as to intermittently short circuit the resistance 12 in the circuit of the generator field. However, it may be located at A, in which position the line circuit and the charging circuit of the storage battery will be intermittently interrupted, at B where it will interrupt the line circuit, the charging circuit of the storage battery and the field circuit or at C where it will interrupt the field circuit.

In the device illustrated in Fig. 2, 15 is a cam mounted upon the shaft 16 which is connected to the armature 10 so as to run at the same speed therewith. 17 is a spring plate having a projection 18 thereon, adjacent the top of the cam 15, and a contact 19 on the opposite side thereof. The plate 17 is attached by means of the insulating block 20 to the metallic lever or vibratory support 21 which is pivoted at 22 to the frame of the vehicle. The contact 23 is located on the lever 21 just over the contact 19. To the lower side of the lever 21 at the free end thereof is attached the spring 24 which is held by the adjustable bolt 25 to the frame of the vehicle. On the upper side of the lever 21 directly above the spring 24 may be connected a dash-pot consisting of plunger 26 working in cylinder 27. Leads 28 and 29 are connected to the plate 17 and the lever 21 respectively.

The operation of the above described device is as follows:—The contact 19 is forced against the contact 23 by the rotation of the cam 15. The action is to first force the said contents together and then to raise the lever 21 about the pivot 22. After the passage of the cam the lever falls back by reason of its own weight and the force exerted by the spring 24. As the speed of rotation of the cam is great, the lever 21 by reason of its inertia does not fall back quickly enough to follow the outline of the cam and remains in oscillation about a mean position which is further removed from the shaft 16 in proportion to its speed. The greater this distance, the shorter at each revolution of the cam will be the period of contact between the elements 19 and 23. The dash-pot serves to diminish oscillation of the lever 21 about its mean position and also to diminish the jarring effect of the vehicle. When the contacts 19 and 23 are together the resistance 12 is short circuited thus strengthening the field. As an increase in speed diminishes the period of contact and therefore the period during which the resistance is short circuited the effect of an increase in speed will be to weaken the field.

In Figs. 3 and 4 a modification is shown. A brush 30 is attached by means of the flexible wire 31 passing over pulley 32 to spring 34 mounted in the hollow conducting shaft 35 attached to the armature. The brush 30 is held within the radial guide 35'. A disk 36 composed of insulating material and having set therein the metallic plate 37 is mounted so that the brush 30 may bear against the said plate. The brush 30 and plate 37 are connected through leads 36' and 37' in the circuit so as to short circuit the resistance in the field circuit, when they are in contact with each other. The plate 37 is of such shape that when the brush 30 is thrown out toward the periphery of the disk 36 a greater or less extent depending upon the speed of the shaft 35 and its consequent centrifugal force that the period during which the resistance is short circuited will be decreased as the speed increases and vice versa.

In the modification shown in Fig. 5, 38 is a cylinder mounted upon the shaft 38' of the armature. The surface of this cylinder comprises the conducting portion 39 and the insulating portion 40. The brushes 41 and 42 are connected in circuit through brush holders 41' and 42', the former being stationary and the latter movable with cylinder 38, guided by rod 42'' sliding in sleeve 42'''. Attached to the cylinder 38 and rotating about the shaft 38' as an axis is a centrifugal governor 43. As the speed of the shaft 38' increases the governor balls 44 will fly out and cause the cylinder 38 to move toward them on the shaft 39. Owing to the shape of the conducting portion 39 of the cylinder this movement will diminish the period during which the brushes 41 and 42 are short circuited by the same and thus increase the period during which the resistance is included in the field circuit.

In Fig. 6, 45 is a shaft adapted to be connected to that of the armature by suitable gearing. 46 is a cylindrical receptacle composed of insulating material and having a lower portion 47 of small diameter containing mercury and an upper portion 48 of greater diameter having set in the side wall thereof the conducting plate 49. Attached to the shaft 45 is the tube 50 having tubes 51 and 52 branching from the upper part thereof. The lower portion of the said tube 50 is immersed in the mercury contained in the receptacle 46. Rotation of the tube with its diverging arms will throw the mercury contained in the arms outward by centrifugal force. The vacuum thereby produced in the tube 50 will raise mercury from the receptacle 46 and cause a continuous stream to be thrown against the walls of the upper portion 48 upon the principle of the well known centrifugal pump. A centrifugal device such as a ball governor 52' is connected to the shaft 45 so as to raise the same as the speed of the generator increases. As the speed of the shaft 45 increases the height to which the mercury will be thrown through the tubes 51, 52 will be increased and, on account of the shape of the conducting plate 49, the higher the mercury is thrown thereon the shorter the period during which the resistance will be short circuited. The mercury bath and the plate 49 are adapted to form terminals in the circuit so as to permit the resistance 12 to be short circuited by the mercury.

In Fig. 8 the vibratory support comprising the spring 53 is attached to the frame of the vehicle by means of the clamp 53'. Mounted on the lower side of the spring 53 is conductive arm 54 having contact 55 on the lower side thereof. Attached to one end of the lever 54 and separated therefrom by the insulating block 56 is the spring plate 57 having contact 58 on the upper face thereof. On the lower side of said spring is mounted the plate 59 which is adapted to contact with the cam 60 mounted upon the shaft 61 of the armature. A hook 62 of insulating material mounted upon the end of the lever 54 limits the separation of the contacts. 63 and 64 are conductors which are connected to the spring plate 57 and the lever 54 respectively. 65 represents the resistance to be inserted in the field. 66 is a condenser for diminishing the sparking between contacts 55 and 58. The operation of this modification of my invention is substantially similar to that of the device shown in Fig. 2.

The device shown in Fig. 8 is open to the objection that for certain speeds of revolution of the cam 60 the inherent vibratory frequency of the spring 53 may interfere with the effect of the impulses given to it by the cam. If the number of revolutions per second of the cam is equal to the frequency of the spring or it is a sub-multiple of the same the spring will receive impulses from the cam which will increase the amplitude of its oscillations. The result would be that the duration of the period of contact will be decreased or increased depending upon whether the cam comes in contact with the spring as the latter is moving away from it or when it is approaching it. The device shown in Fig. 9 is intended to overcome this difficulty. This is done by making the contacts and the parts which support them as light as possible in order to increase the frequency of the spring and so to diminish the chances of resonance. The spring 68 is fastened by means of the clamp 69 to the stationary part of the vehicle and secured to the said spring and separated therefrom by the insulating block 70 is the spring 71. At the outer ends of the aforesaid springs are located the contacts 72. The cam 73 mounted on the shaft 74 serves to force the contacts together and then to elevate the superposed parts as a unit. In order to prevent the spring 68 from following the cam 73 when the latter rotates at speeds inferior to the inherent frequency of the spring, it is necessary to connect it to a device which will exercise a braking effect upon it. Any device acting as a dash-pot will serve this purpose. I have shown a mass 75 adapted to slide upon the rod 76, which is fastened to the spring 68 and which has cushions 77, 78 mounted at the lower and upper extremities of the same. It will be seen that the inertia of the mass 75 opposes itself to its rapid displacement by the spring 68. It will hold the latter by pressing against the upper cushion or abutment 78 when the spring tends to follow the cam 73 toward the shaft 74. And yet it will not oppose the rapid rise of the spring under the action of the cam further along in its revolution since the rod 76 will be forced upwardly through the mass 75 until the lower abutment 77 strikes the said mass. The upper abutment may be regulated by means of nut 79. If desired the inertia of the mass may be increased by surrounding the same with an electromagnetic coil 80. In Fig. 9 the leads 81 and 82 are connected to the springs 71 and 68 respectively and the condenser 83 is provided to diminish the spark. In Fig. 10 is illustrated a modification of this device which consists merely in substituting for the spring 68 the spring 84 which is bent so as to have a comparatively high frequency of vibration.

It may be desirable to include in the system means for increasing the voltage of the generator when lamps or other translating devices are included in the circuit over that when the storage battery alone is in circuit. This may be easily done in a system including my invention on account of the fact that its operation is dependent upon the speed and not upon the load upon the generator. In Fig. 11 is illustrated such a system in which a portion of the field resistance which the interrupter short circuits periodically is short circuited continuously while the lamps are in circuit. The system includes a generator having armature 85 which charges the storage battery 86 and also, when the switch 87 is closed, supplies energy to the lamps 88. Included also in the circuit is the solenoid 89. The field 90 of the generator has in circuit therewith the resistance 91. The lead 92 is connected to a point corresponding to an intermediate value of this resistance. When the switch 87 is closed the solenoid 89 is energized and magnetizes the core 93. This attracts the armature 94 and insulating bar 95 closing contacts 96. The effect is to include in the field circuit a part only of the resistance 91. The action of the periodic interrupter 97 embodying my invention is not affected except that it acts upon a smaller resistance when the lamps are in circuit than when the storage battery alone is in circuit. The switch 98 may be closed by hand if the automatic circuit closing means does not operate.

Various modifications of the above described structure will suggest themselves to those skilled in the art and are to be considered as coming within the spirit of my invention, the scope of which is set forth in the accompanying claims.

What I claim as new, and desire to secure by Letters Patent of the United States, is:—

1. In combination, a variable speed generator, and a voltage regulator for varying the field strength of said generator, comprising a pair of contacts and means for bringing the same together, said means being adapted to be driven by a movable element of said variable speed generator and means for causing the ratio of the period of closure to that of opening of said contacts to vary inversely as the speed of the movable element of the generator.

2. In combination, a variable speed generator, and a voltage regulator for varying the field strength of said generator, comprising a pair of contacts and means for bringing the same together, said means being adapted to be driven by a movable element of said variable speed generator and said device being so arranged that the ratio of the period of closure to that of opening of said contacts will vary inversely as the speed of the movable element of the generator.

3. The combination, in a voltage regulator for varying the field strength of a variable speed generator, of a vibratory support, a spring having one end secured thereto to vibrate therewith but insulated therefrom, the other end of said spring being free to vibrate independently of the support, a contact on the free end of said spring, a coöperating contact on said support, and a cam mounted upon a shaft and adapted to bear against the free end of said spring so as to bring said contacts together and allow them to separate upon the rotation of the shaft.

4. The combination, in a voltage regulator for varying the field strength of a variable speed generator, of a main spring mounted to vibrate, a secondary spring having one end secured thereto to vibrate therewith but insulated therefrom, the other end of the latter spring being free to vibrate independently of said main spring, a contact on the free end of said secondary spring, a coöperating contact on said main spring, and a cam mounted upon a shaft and adapted to bear against the free end of said secondary spring so as to bring said contacts together and allow them to separate upon the rotation of the shaft.

5. The combination, in a voltage regulator for varying the field strength of a variable speed generator, of a vibratory support, a spring having one end secured thereto to vibrate therewith but insulated therefrom, the other end of said spring being free to vibrate independently of the support, a contact on the free end of said spring, a coöperating contact on said support, a cam mounted upon a shaft and adapted to bear against the free end of said spring so as to bring said contacts together and allow them to separate upon the rotation of the shaft, and means for increasing the inertia of said vibratory support.

6. The combination, in a voltage regulator for varying the field strength of a variable speed generator, of a vibratory support, a spring having one end secured thereto to vibrate therewith but insulated therefrom, the other end of said spring being free to vibrate independently of the support, a contact on the free end of said spring, a coöperating contact on said support, a cam mounted upon a shaft and adapted to bear against the free end of said spring so as to bring said contacts together and allow them to separate upon the rotation of the shaft, and means for increasing the inertia of said vibratory support comprising a weight loosely attached to the vibrating portion of said support.

7. The combination, in a voltage regulator for varying the field strength of a variable speed generator, of a main spring mounted to vibrate, a secondary spring having one end secured thereto to vibrate therewith but insulated therefrom, the other end of the latter spring being free to vibrate independently of said main spring, a contact on the free end of said secondary spring, a coöperating contact on said main spring, a cam mounted upon a shaft and adapted to bear against the free end of said secondary spring so as to bring said contacts together and allow them to separate upon the rotation of the shaft, and means for increasing the inertia of said main spring comprising a weight loosely attached to the vibrating portion of said main spring.

8. In a device of the class described, the combination of a reciprocatable member spring moved in one direction, an electromagnet adapted when energized to steady the movement of said reciprocatable member and retard its movement, a second reciprocatable member normally in contact with the first member and movable toward and from it, means for conducting electric current to said reciprocatable members at their point of contact with each other, and means for moving the second reciprocatable member toward and from the first member, for the purposes set forth.

9. In a device of the class described, the combination of a reciprocatable member spring moved in one direction, a second reciprocatable member normally in contact with the first member and movable toward and from it, mechanism for mechanically so moving the second member, means for conducting electric current through said members at their point of contact with each other, and a magnet adapted when energized to proportionally control the movement of the first mentioned reciprocatable member, for the purposes specified.

10. A system of electric current distribution including a variable speed electric current generator; a consumption circuit supplied thereby; a current regulating circuit for regulating the output of the generator; and a regulator controlling the latter circuit, this regulator including a vibratory contact, means for vibrating said contact proportionately to the speed of the generator, and a sluggishly moving follow up contact complemental to the aforesaid contact.

In witness whereof, I have hereunto set my hand this 26th day of June, 1912.

ANDRÉ BOURY.

Witnesses:
  H. C. COXE,
  WERNER HILDEBRAND.